(12) United States Patent
Sawai

(10) Patent No.: US 12,206,743 B2
(45) Date of Patent: Jan. 21, 2025

(54) CONTROL DEVICE, CONTROL METHOD, AND STORAGE MEDIUM

(71) Applicant: CANON KABUSHIKI KAISHA, Tokyo (JP)

(72) Inventor: Yuki Sawai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/318,856

(22) Filed: May 17, 2023

(65) Prior Publication Data
US 2023/0403335 A1 Dec. 14, 2023

(30) Foreign Application Priority Data

Jun. 8, 2022 (JP) .................................. 2022-093022

(51) Int. Cl.
*H04L 67/52* (2022.01)
*H04L 51/222* (2022.01)
(Continued)

(52) U.S. Cl.
CPC ............ *H04L 67/52* (2022.05); *H04L 51/222* (2022.05); *H04L 67/12* (2013.01); *H04L 67/55* (2022.05)

(58) Field of Classification Search
CPC ......... H04W 4/44; H04W 4/029; H04W 4/46; H04W 40/24; H04W 4/02; H04W 4/021;
(Continued)

(56) References Cited

U.S. PATENT DOCUMENTS

| 7,188,341 | B1 * | 3/2007 | Hawthorne | ........... B61L 25/025 |
| | | | | 717/171 |
| 2006/0215617 | A1 * | 9/2006 | Martin | .................... H04B 7/212 |
| | | | | 370/337 |

(Continued)

FOREIGN PATENT DOCUMENTS

| WO | 2018/100661 A1 | 6/2018 |
| WO | 2021/018529 A1 | 2/2021 |

OTHER PUBLICATIONS

Extended European Search Report issued in corresponding EP Patent Application No. 23172214.1 dated Sep. 20, 2023, pp. 1-12.

*Primary Examiner* — Tonia L Dollinger
*Assistant Examiner* — Linh T. Nguyen
(74) *Attorney, Agent, or Firm* — Carter, DeLuca & Farrell LLP

(57) ABSTRACT

A control device mountable on a movable apparatus includes a position information acquisition unit configured to acquire position information of the movable apparatus, a position information notification unit configured to notify an information processing device of the position information acquired by the position information acquisition unit, a distribution connection area acquisition unit configured to acquire, from the information processing device, distribution connection area information corresponding to the position information notified by the position information notification unit, a transmission unit configured to transmit any one of a subscription registration request and a subscription cancellation request to the information processing device on the basis of an area indicated by the distribution connection area information acquired by the distribution connection area acquisition unit and a position indicated by the position information acquired by the position information acquisition unit, and a reception unit configured to receive a published (Continued)

message transmitted from the information processing device in response to the request transmitted by the transmission unit.

12 Claims, 14 Drawing Sheets

(51) Int. Cl.
*H04L 67/12* (2022.01)
*H04L 67/55* (2022.01)

(58) Field of Classification Search
CPC ....... H04W 4/022; H04W 92/14; H04W 8/20; H04W 4/40; H04W 84/005; H04W 88/08; H04W 48/20; H04W 40/20; H04W 40/246; H04W 76/10; G08G 1/123; H04L 67/12; H04L 67/55; H04L 51/222; H04L 51/224; H04L 67/52
See application file for complete search history.

(56) References Cited

U.S. PATENT DOCUMENTS

| | | | |
|---|---|---|---|
| 2008/0198790 A1* | 8/2008 | Harpak | H04B 7/18517 370/316 |
| 2013/0322401 A1* | 12/2013 | Visuri | H04W 12/068 370/331 |
| 2017/0139411 A1* | 5/2017 | Hartung | H04L 12/40 |
| 2017/0280413 A1* | 9/2017 | Zhang | H04W 64/003 |
| 2018/0183873 A1* | 6/2018 | Wang | G05D 1/0088 |
| 2019/0102402 A1* | 4/2019 | Perron | H04L 51/214 |
| 2019/0371180 A1 | 12/2019 | Hara et al. | |
| 2020/0260239 A1* | 8/2020 | Ahn | G08G 1/0112 |
| 2021/0258982 A1* | 8/2021 | Otaka | H04W 28/0226 |
| 2021/0278851 A1* | 9/2021 | Van der Merwe | G05D 1/0246 |
| 2021/0306827 A1* | 9/2021 | Sagane | H04W 4/46 |
| 2022/0263750 A1* | 8/2022 | Kousaridas | H04L 47/34 |
| 2023/0362694 A1* | 11/2023 | Swar | H04W 24/08 |

* cited by examiner

FIG. 8A

| Order | Publish |
|---|---|
| 1 | Message type |
| 2 | Message length |
| 3 | Topic length |
| 4 | Topic |
| 5 | Message |

FIG. 8B

| Order | Subscribe/Unsubscribe |
|---|---|
| 1 | Message type |
| 2 | Message length |
| 3 | Topic length |
| 4 | Topic |

FIG. 9

| Topic identifier | Distribution range |
|---|---|
| Intersection_00A | Target position information<br>  −Latitude: aaa, Longitude bbb<br>Distribution range information<br>  − Radius of 500 m having target position information as center<br>Distribution connection area information<br>  − 10 m around distribution range information |
| Intersection_00B | Target position information<br>  −Latitude: xxx, Longitude yyy<br>Distribution range information<br>  − Radius of 500 m having target position information as center<br>Distribution connection area information<br>  − 10 m around distribution range information |

CONTROL DEVICE, CONTROL METHOD, AND STORAGE MEDIUM

BACKGROUND OF THE INVENTION

Field of the Invention

The present invention relates to a control device, a control method, a storage medium, and the like that can be mounted on a movable apparatus.

Description of the Related Art

In recent years, technology for realizing support for recognition, determination, and operation of drivers by installing communication functions in automobiles and acquiring various types of information such as road information from a cloud connected to the Internet has been promoted. Specifically, a method of analyzing videos captured by cameras installed on roads and notifying vehicles in motion of analysis results via the Internet or the like, and the like are conceivable.

As a method of notifying a vehicle of analysis results, for example, International Publication No. 2018/100661 describes a configuration in which a vehicle is notified of an asynchronous message via an identifier called a topic using a method called publishing/sub scribing.

In the publishing/subscribing method, a broker that mediates communication between a publishing device and a subscribing device is provided. The subscribing device can subscribe to the broker for desired published messages and receive messages posted by the publishing device to the broker.

However, if a movable apparatus such as a vehicle communicates with a server periodically, for example, the server will have to perform more processing to receive position information and the vehicle will have to perform more processing to transmit position information to the server, and if a large number of vehicles are present, there is a problem of putting pressure on a communication band.

SUMMARY OF THE INVENTION

One aspect of the present invention is a control device mountable on a movable apparatus and includes at least one processor or circuit configured to function as: a position information acquisition unit configured to acquire position information of the movable apparatus; a position information notification unit configured to notify an information processing device of the position information acquired by the position information acquisition unit; a distribution connection area acquisition unit configured to acquire, from the information processing device, distribution connection area information corresponding to the position information notified by the position information notification unit; a transmission unit configured to transmit any one of a subscription registration request and a subscription cancellation request to the information processing device on the basis of an area indicated by the distribution connection area information acquired by the distribution connection area acquisition unit and a position indicated by the position information acquired by the position information acquisition unit; and a reception unit configured to receive a published message transmitted from the information processing device in response to the request transmitted by the transmission unit.

Further features of the present invention will become apparent from the following description of embodiments with reference to the attached drawings.

BRIEF DESCRIPTION OF THE DRAWINGS

FIGS. 8A and 8B are diagrams showing examples of message formats processed by a message processing unit 204 shown in FIG. 2.

FIG. 9 is a diagram showing an example of a table included in a topic management unit 401.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate description will be omitted or simplified.

First Embodiment (System Configuration)

Figure 1:
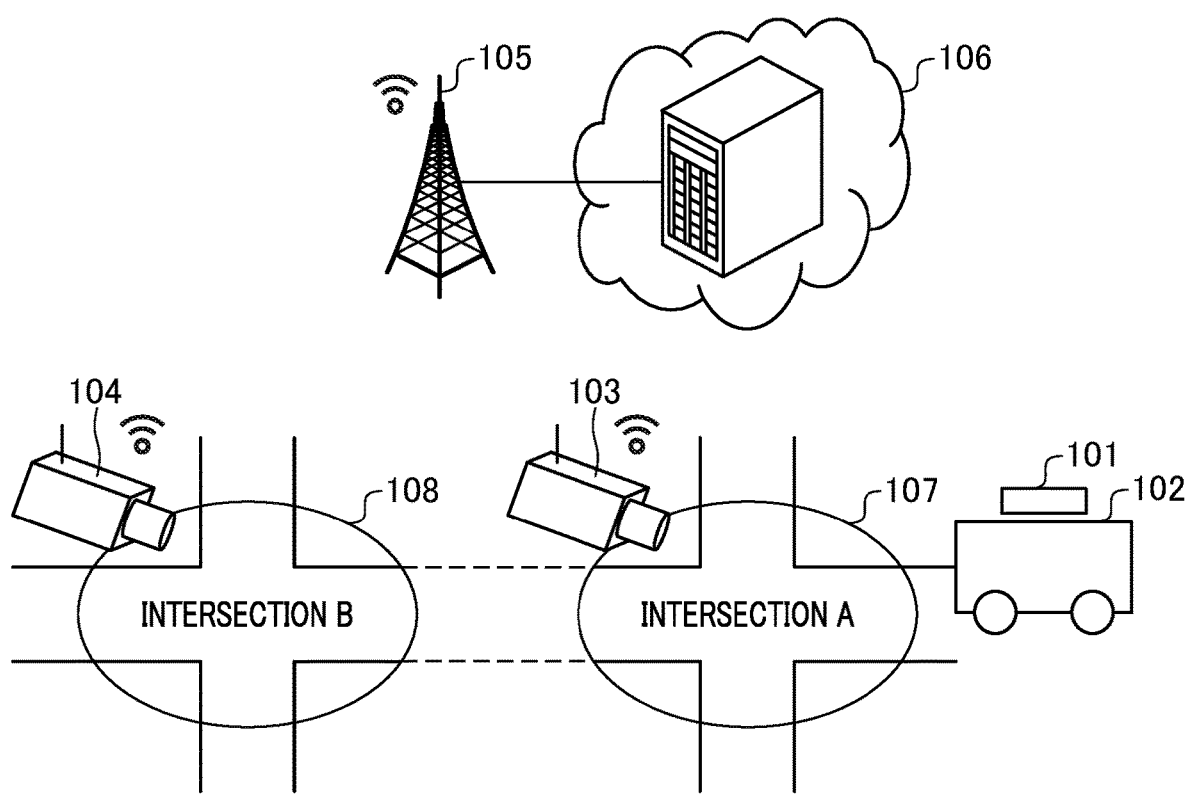
FIG. 1 is a diagram showing a schematic configuration of a system according to a first embodiment of the present invention.

FIG. 1 is a diagram showing a schematic configuration of a system according to a first embodiment of the present invention. FIG. 1 shows a state in which a vehicle 102 such as an automobile is traveling through one of a plurality of intersections. The vehicle 102 is approaching an intersection A107 and is traveling toward an intersection B108.

The vehicle 102 is equipped with an in-vehicle device 101 capable of wireless communication. The in-vehicle device 101 is an example of a control device. The vehicle 102 is an example of a movable apparatus and has a moving unit (not shown) such as an engine or a motor for moving the movable apparatus. A control device according to the present invention is mountable on the movable apparatus. That is the control device includes a fixedly mounted apparatus or a mobile PC tablet or the like that can be brought into the movable apparatus. The in-vehicle device 101 is capable of wireless communication via a base station 105 and realizes publish/subscribe message exchange via a server 106. The in-vehicle device 101 serves as a subscribing device. Details of the in-vehicle device 101 will be described later.

The server 106 is a server that performs various types of data processing. The server 106 can be connected to the in-vehicle device 101, a camera 103, and a camera 104 via the base station 105 through wireless communication. Details of the server 106 will be described later. The server 106 is an example of an information processing device.

The cameras 103 and 104 are devices that are installed on a road and can capture an image of traffic conditions such as intersections, analyze road information from captured image data, and notify other devices of analysis results wirelessly or by wire. The camera 103 is installed at a position at which it can capture an image of the vicinity of the intersection A107, and the camera 103 is installed at a position at which it can capture an image of the vicinity of the intersection B108.

The base station 105 is a base station device for mobile communication having a communication area at least near the intersection A107 and the intersection B108. The base station 105 wirelessly communicates with the in-vehicle device 101, the camera 103, and the camera 104 within the communication area. The base station 105 enables communication between equipment that performs wireless communication within the communication area and the server 106 located on the Internet or a cloud.

The in-vehicle device 101, the camera 103, the camera 104, and the server 106 are in a state in which they can communicate on the same network through the base station 105. The intersection A107 and the intersection B108 are intersections through which the vehicle 102 and other vehicles can pass.

(Configuration of Device)

Next, configurations of the in-vehicle device 101, the camera 103, the camera 104, and the server 106 according to the first embodiment will be described. The configuration which will be described below is merely an example, and a part (or in some cases, all) of components described may be replaced with another component that performs a similar function or may be omitted, and the components described may be added thereto. Furthermore, one block shown in the following description may be divided into a plurality of blocks or a plurality of blocks may be integrated into one block.

Figure 2:
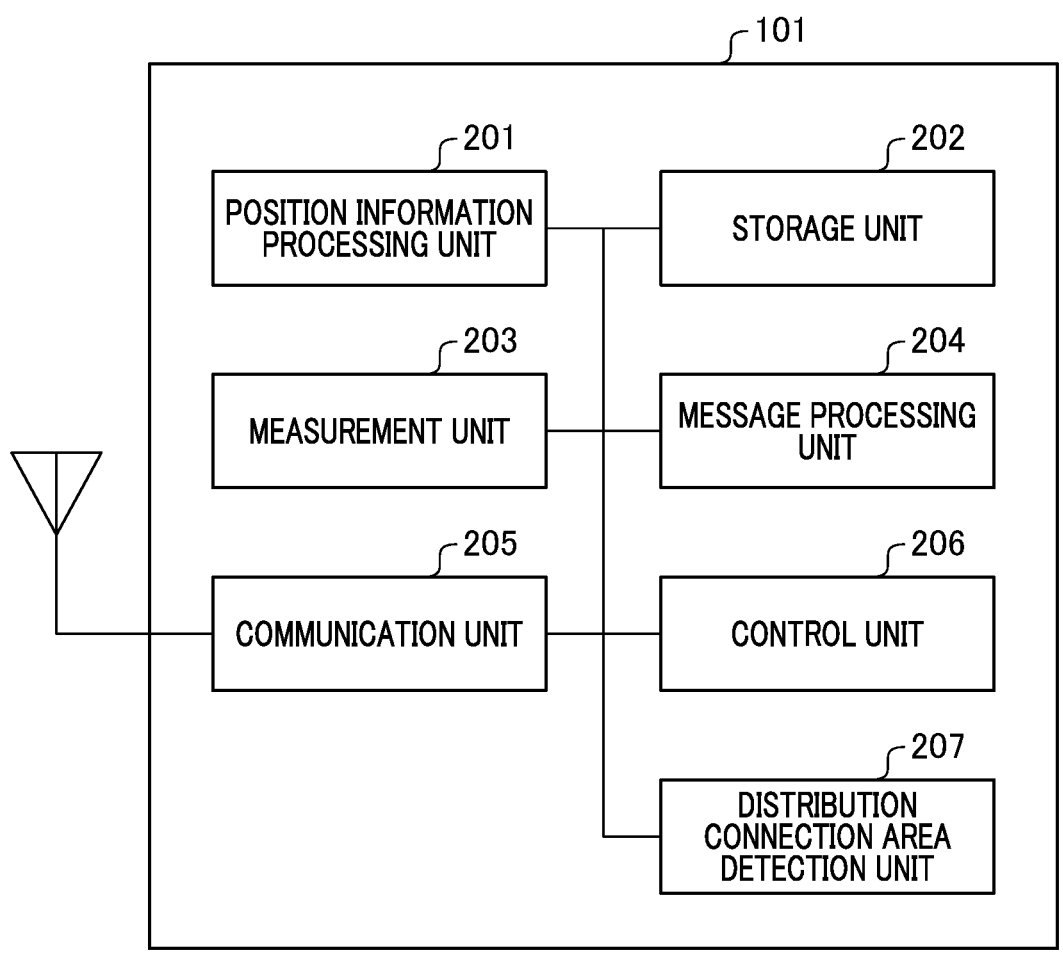
FIG. 2 is a block diagram showing a configuration of an in-vehicle device 101 shown in FIG. 1.

FIG. 2 is a block diagram showing the configuration of the in-vehicle device 101 shown in FIG. 1. The in-vehicle device 101 includes a position information processing unit 201, a storage unit 202, a measurement unit 203, a message processing unit 204, a communication unit 205, a control unit 206, and a distribution connection area detection unit 207.

The position information processing unit 201 manages and processes position information of the vehicle 102 equipped with the in-vehicle device 101. The position information processing unit 201 acquires the position information of the vehicle 102 from a GNSS, an odometer, a gyro sensor, an acceleration sensor, and the like provided in the vehicle 102. GNSS is an abbreviation for Global Navigation Satellite System.

The storage unit 202 stores topic information and the like necessary for the publishing/subscribing method. The measurement unit 203 is a measurement unit that measures a moving distance, moving time, and the like of a vehicle that is traveling. The message processing unit 204 realizes message communication according to the publishing/subscribing method. The message processing unit 204 mainly realizes processing on a subscribing side in the in-vehicle device 101.

The communication unit 205 transmits messages generated by the message processing unit 204, messages generated by the control unit 206, and the like via the base station 105 through wireless communication. The communication unit 205 also performs processing for receiving messages and the like from other devices via the base station 105. The control unit 206 performs control by controlling each function in the above-described in-vehicle device 101.

The distribution connection area detection unit 207 determines a positional relationship between the position information of the vehicle 102 equipped with the in-vehicle device 101 and a distribution connection area. Details of the distribution connection area will be described later.

Figure 3:
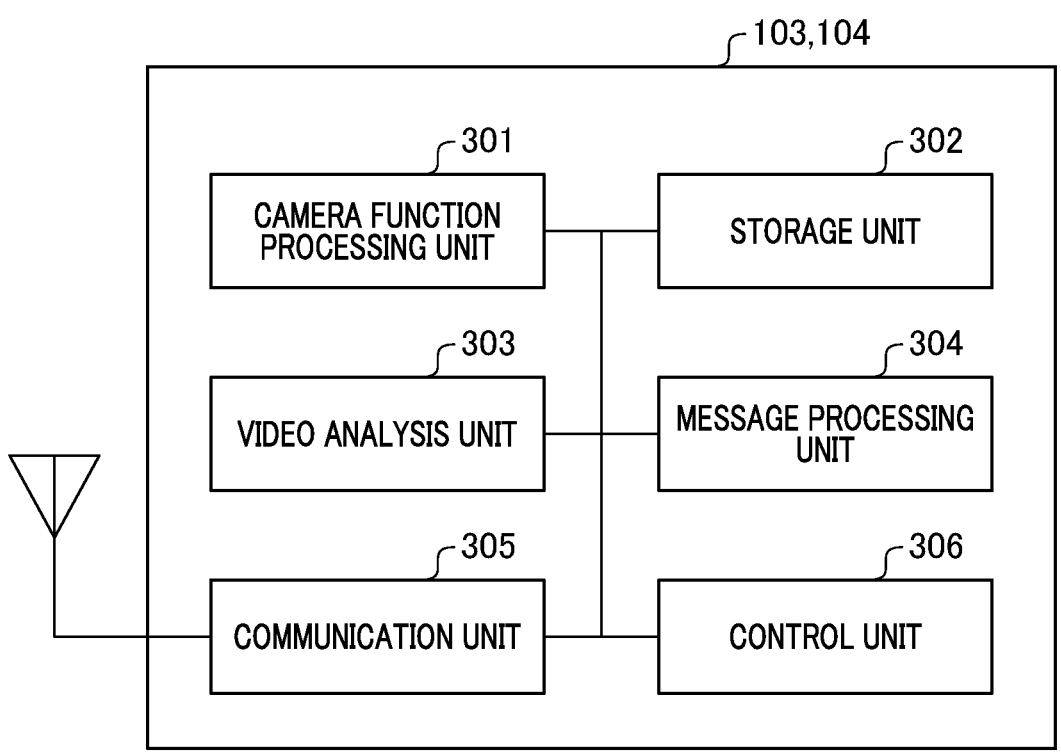
FIG. 3 is a block diagram showing a configuration of each of cameras 103 and 104 shown in FIG. 1.

FIG. 3 is a block diagram showing the configuration of each of the cameras 103 and 104 shown in FIG. 1. The cameras 103 and 104 each have a camera function processing unit 301, a storage unit 302, a video analysis unit 303, a message processing unit 304, a communication unit 305, and a control unit 306. Although the camera 103 will be described below, the configuration of the camera 104 is the same as that of the camera 103.

The camera function processing unit 301 performs general processing of a camera function such as video shooting. The storage unit 302 stores information about the camera function, information about the installation location of the camera 103, information about a captured video range, and the like. The storage unit 302 also stores topics associated with the information about the installation location of the camera 103, the information about the captured video range, and the like.

Here, the camera 103 installed near the intersection A107 stores this information under the topic name "Intersection_00A." Further, the camera 104 installed near the intersection B108 stores this information under the topic name "Intersection_00B."

The video analysis unit 303 analyzes a video captured by the camera function processing unit 301 and analyzes road conditions such as intersections. Specifically, the video analysis unit 303 analyzes events that affect vehicle operation, such as presence or absence of accidents, traffic jams, emergency vehicles, construction vehicles, and abnormally running vehicles, and the like.

The message processing unit 304 realizes message communication according to the publishing/subscribing method. The message processing unit 304 mainly realizes processing on a publishing side and generates messages for publishing-distributing analysis results from the video analysis unit 303. In addition, the message processing unit 304 distributes messages by associating the information about the installation location of the camera, the information about the captured video range, and the like stored in the storage unit 302 with topics.

The communication unit 305 performs wireless communication via the base station 105 and transmits a message generated by the message processing unit 303 to the server 106. The control unit 306 performs control by controlling each function in the camera 103 described above.

Figure 4:
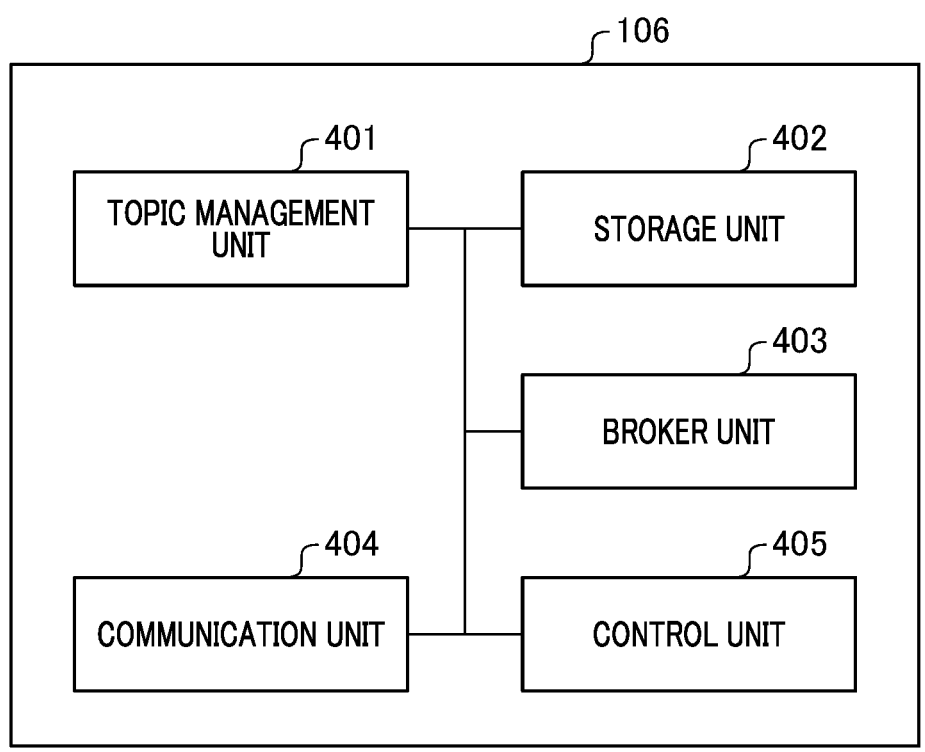
FIG. 4 is a block diagram showing a configuration of a server 106 shown in FIG. 1.

FIG. 4 is a block diagram showing the configuration of the server 106 shown in FIG. 1. The server 106 includes a topic management unit 401, a storage unit 402, a broker unit 403, a communication unit 404, and a control unit 405.

The topic management unit 401 manages data for notifying the in-vehicle device 101 of a topic for which optimal road traffic information can be received for position information received from the in-vehicle device 101. Further, the topic management unit 401 manages distribution range information and distribution connection area information corresponding to the topic.

Here, the topic management unit 401 will be described in more detail with reference to FIGS. 9 and 10. FIG. 9 is a diagram showing an example of a table included in the topic management unit 401. FIG. 10 is a diagram for describing entering and exiting a distribution connection area.

As shown in FIG. 9, the topic management unit 401 manages "target position information," "distribution range information," and "distribution connection area information" in association with a "topic identifier." The "topic identifier" is an identifier used by each of the cameras 103 and 104 at the time of publishing distribution.

The "target position information" is geographical position information of the camera. The "distribution range information" is information indicating a range in which information captured and analyzed by the camera is distributed. In FIG. 10, a range 1002 indicates the range determined by the "distribution range information." The "distribution connection area information" is information indicating a connection area of the distribution range.

In FIG. 10, the range 1003 indicates the range determined by the "distribution connection area information." The in-vehicle device 101 determines the connection area of the distribution range using the "distribution connection area information." This "distribution connection area information" correspond to an area provided such that a moving vehicle receives distribution of information before reaching the distribution range in consideration of delays including a delay in communication between the in-vehicle device 101 and the base station 105, a processing time of the in-vehicle device 101 and the server 106, and the like.

Although the range 1002 which is the "distribution range information" is shown as a circular range in FIGS. 9 and 10, it is not limited to a circular range and may be managed using an arbitrary rectangle, polygon, and a logical product and a logical sum of combinations thereof.

Further, although the range 1003 which is the "distribution connection area information" is described as distance information offset with respect to the "distribution range information" in FIGS. 9 and 10, it is not limited thereto and may be managed in the same manner as the "distribution range information." Further, the server 106 may perform management such that the distribution range is handled synonymously with the distribution connection area, assuming that there is no setting as the distribution connection area.

The "distribution connection area information" may be calculated by the server 106 on the basis of the boundary of the "distribution range information." Further, the server 106 may prepare and manage a plurality of distribution connection areas for a single "topic identifier" and use them suitably according to the purpose.

For example, different distribution connection areas may be set according to the speed of the vehicle, or the server 106 may be notified of attributes of vehicles, motorcycles, bicycles, pedestrians, and the like to switch to a suitable distribution connection area, or dynamically switch distribution connection areas.

The server 106 may statically store the information shown in FIG. 9 in advance. The server 106 may execute processing such as acquiring the information shown in FIG. 9 from the cameras 103 and 104 at the time of or immediately after connection processing of the cameras 103 and 104 which will be described later.

For example, a method in which the server 106 is notified from the cameras 103 and 104 of attribute information such as installation position information, distribution range information, distribution connection area information, and a topic name to be used at the time of publishing in association with each other and stores them is conceivable. The distribution connection area information may be determined by the control unit 405 of the server 106. The server 106 stores the information shown in FIG. 9 in storage unit 402.

The topic management unit 401 can select an optimal topic by comparing position information received from the in-vehicle device 101 and distribution range information of the cameras 103 and 104.

The broker unit 403 mediates communication between a publishing device and a subscribing device in the publishing/subscribing method. An example of processing is described below. When the broker unit 403 receives a subscription registration request transmitted from another device, the broker unit 403 associates the IP address, port number, and the like of the device with a desired topic and stores the same in the storage unit 402.

Further, when the broker unit 403 receives a publishing distribution request from another device, the broker unit 403 distributes a message to the device if a subscription registration request is received for the topic of the distribution request.

The communication unit 404 receives subscription registration requests processed by the broker unit 403 and distributes published messages. The communication unit 404 realizes communication with the cameras 103 and 104 and the in-vehicle device 101 via the base station 105. The control unit 405 performs control by controlling each function in the server 106 described above.

(Description of Processing)

Figure 5:
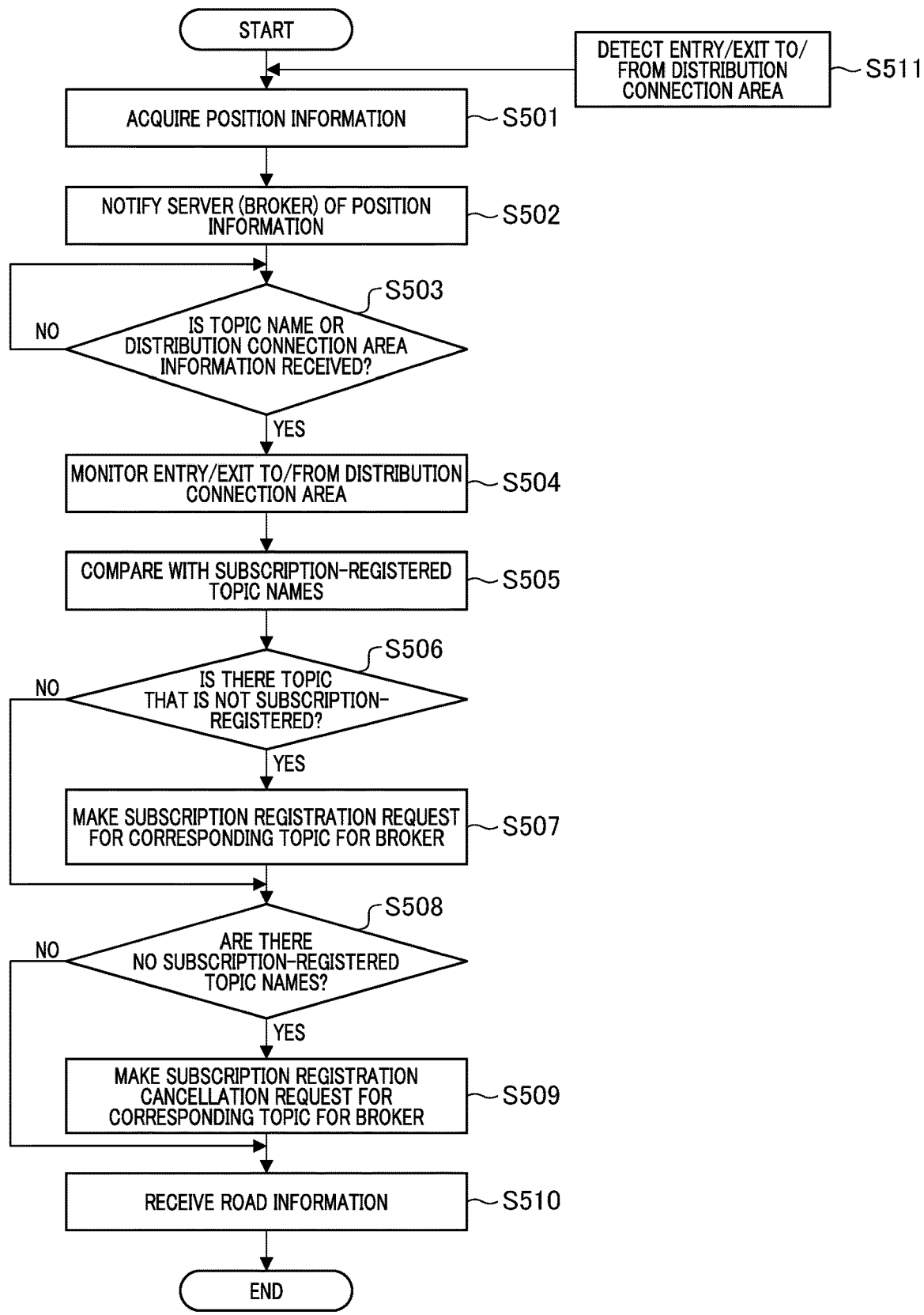
FIG. 5 is a flowchart showing processing executed by the in-vehicle device 101 shown in FIG. 1.

Processing of the system of the first embodiment will be described below with reference to the flowcharts shown in FIGS. 5 and 6 and the operation sequence diagram shown in FIG. 7. FIG. 5 is a flowchart showing processing executed by the in-vehicle device 101.

The flowchart shown in FIG. 5 can be realized by the control unit 206 executing a control program stored in the storage unit 202 to perform calculation and processing of information and control of each piece of hardware.

Figure 6:
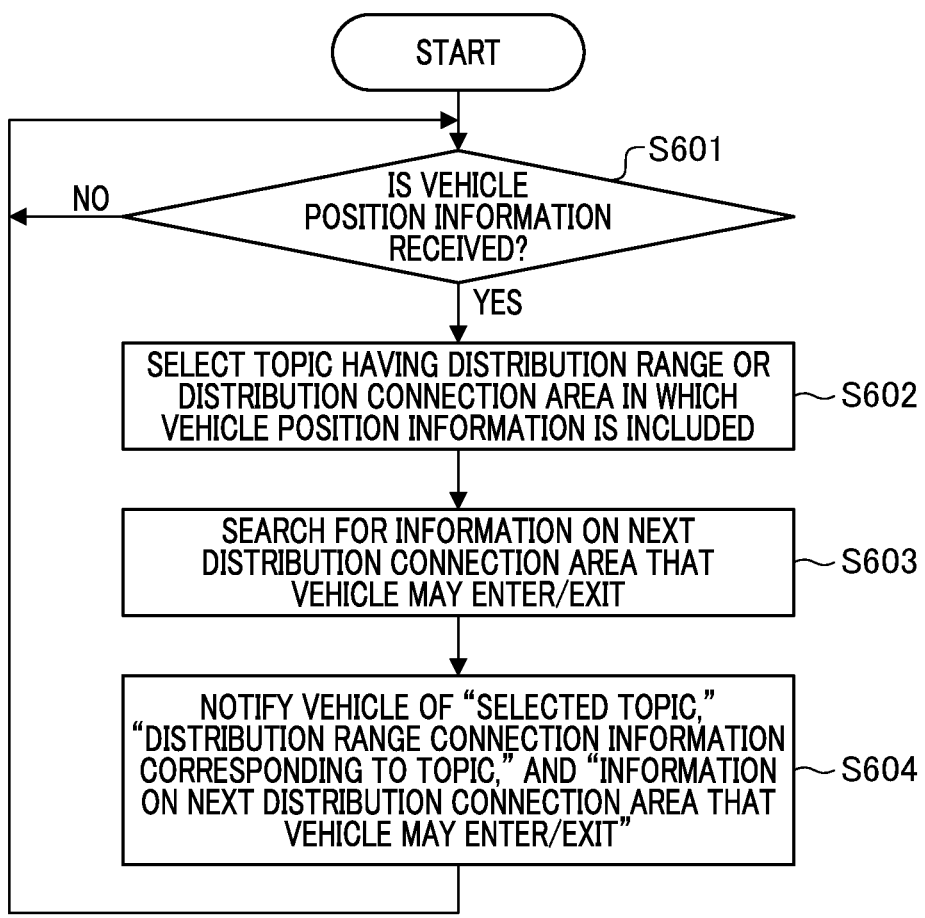
FIG. 6 is a flowchart showing processing executed by the server device 106 shown in FIG. 1.

FIG. 6 is a flowchart showing processing executed by the server device 106. The flowchart shown in FIG. 6 can be realized by the control unit 306 executing a control program stored in the storage unit 302 to perform calculation and processing of information and control of each piece of hardware.

Figure 7:
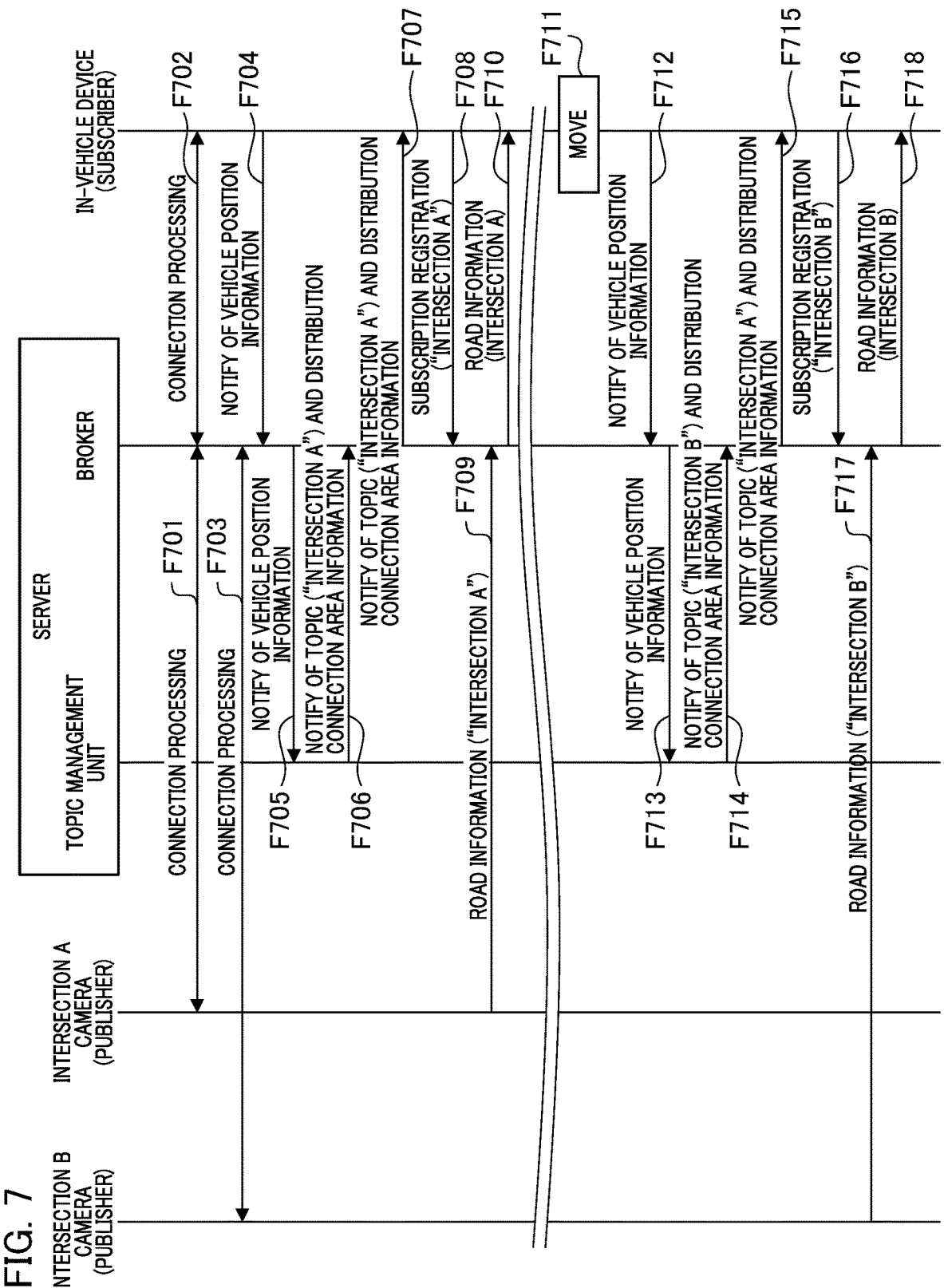
FIG. 7 is an operation sequence diagram of the system according to the first embodiment of the present invention.

First, as shown in FIG. 7, connection processing between devices is performed. The in-vehicle device 101, the camera 103, the camera 104, and the server 106 are in a state in which they can communicate on the same network through the base station 105. In step F701 of FIG. 7, the camera 103 and the server 106 perform connection processing according to a protocol that realizes the publishing/subscribing method.

In step F702, the server 106 and the in-vehicle device 101 perform connection processing according to the protocol that realizes the publishing/subscribing method. In step F703, the camera 104 and the server 106 perform connection processing according to the protocol that realizes the publishing/subscribing method.

Examples of the protocol of the publishing/subscribing method include MQ Telemetary Transport (MATT), Robot Operating System (ROS), and the like. Any one may be used in the first embodiment.

The in-vehicle device 101 first executes the following processing. In step S501 of FIG. 5, the control unit 206 of the in-vehicle device 101 acquires position information of the vehicle 102 equipped with the in-vehicle device 101 from the vehicle 102 via the position information processing unit 201. This processing performed by the position information processing unit 201 is an example of a position information acquisition step of acquiring the position information of the vehicle 102.

Here, the position information of the vehicle 102 is information indicating the current position of the vehicle 102. Further, it is assumed here that the vehicle 102 is traveling at the point of the intersection A107 in FIG. 1. The position information is originally composed of complicated data such as GNSS, gyro sensor, and acceleration sensor data but here, they are collectively represented as "intersection A position information."

In steps S502 and F704, the control unit 206 notifies the server 106 of "intersection A position information" which is the acquired position information via the communication unit 205. This processing performed by the communication unit 205 is an example of a position information notification step of notifying the server 106 of the position information acquired in the position information acquisition step.

In step S503, the control unit 206 waits for a response from the server 106. Information received through a response from the server 106 includes both a topic name and distribution connection area information, or only the distribution connection area information.

Processing of receiving a response from the server 106 is an example of a distribution connection area acquisition step of acquiring, from the server 106, the distribution connection area information corresponding to the position information notified in the position information notification step. When the control unit 206 determines that a response has been received from the server 106, processing of step S504 is executed.

In step S504, the control unit 206 updates the position information according to movement of the vehicle 102, and monitors entry/exit of the vehicle 102 to/from the distribution connection area while constantly comparing the position information with the distribution connection area information. This processing is an example of a comparison step of comparing the area indicated by the distribution connection area information acquired in the distribution connection area acquisition step with the position indicated by the position information acquired in the position information acquisition step.

In this step, the control unit 206 may determine whether or not the vehicle 102 has entered or exited the distribution connection area depending on whether or not the position information of the vehicle 102 is included in the distribution connection area with reference to the distribution connection area information along with update of the position information according to movement of the vehicle 102.

On the other hand, the server 106 executes the following processing. In step S601 of FIG. 6, the control unit 405 of the server 106 determines whether the position information of the vehicle 102 has been received from the in-vehicle device 101 via the communication unit 404. When the control unit 405 determines that the position information of the vehicle 102 has been received, processing of step S602 is executed.

In step F705, the control unit 405 transfers the received position information of the vehicle 102 to the topic management unit 401. Here, it is assumed that "intersection A position information" has been received as the position information of the vehicle 102.

In steps S602 and F706, the control unit 405 causes the topic management unit 401 to select a topic having a distribution range or a distribution connection area in which the "intersection A position information" is included. An example of a table managed by the topic management unit 401 is the table shown in FIG. 9.

Here, it is assumed that the latitude and longitude included in the "intersection A position information" are within a distribution range or a distribution connection area indicated by the topic identifier "Intersection_00A" of the table. Therefore, the topic management unit 401 selects "Intersection_00A" as the topic identifier.

In step S603, the control unit 405 searches for information on the next distribution connection area that the vehicle 102 may enter. As a method of searching for this distribution connection area information, for example, a method of extracting route information that the vehicle 102 can take and searching for connection area information through which the vehicle 102 passes first on all routes can be used.

As another method, for example, a method of designating a radius having the position of the vehicle 102 as a center and searching for connection area information present within the radius can be used. As a method of searching for the distribution connection area information, it is preferable to adopt a method that does not miss any retrieval.

In steps S604 and F707, the control unit 405 notifies the in-vehicle device 101 of "selected topic," "distribution connection area information corresponding to the topic," and "information on next distribution connection area that the vehicle may enter/exit" via the communication unit 404.

Subsequently, the in-vehicle device 101 executes the next processing. In step S505, the control unit 206 stores topics subscription-registered so far and compares received topics with the subscription-registered topics.

In step S506, as a result of comparison in step S505, the control unit 206 determines whether or not there is any topic that has not been subscription-registered topic among the received topics. If the control unit 206 determines that there is a topic that has not been subscription-registered among the received topics, processing of step S507 is executed.

If the control unit 206 determines that there is no topic that has not been subscription-registered among the received topics, processing of step S508 is executed. If the current state is a state in which subscription registration has not yet been performed, processing of step S507 is executed.

In step S507, the control unit 206 makes a subscription registration request with respect to a topic that has not been subscription-registered among the received topics. This processing is an example of transmission means for transmitting a subscription registration request and a subscription cancellation request to the server 106 according to the comparison result of the comparison step. Here, the subscription registration request will be described.

FIG. 8 is a diagram showing an example of message formats processed by the message processing unit 204. At the time of subscription, the message processing unit 204 sets "Subscribe" to "message type" of a message using the format shown in FIG. 8B.

Subsequently, the message processing unit 204 sets "Intersection_00A" previously notified as the topic name to "message length," "topic length," and "topic" of the message to generate the message. In step F708, the control unit 206 transmits the message generated by the message processing unit 204 to the server 106 via the communication unit 205 as a subscription registration request.

When the control unit 405 of the server 106 receives the subscription registration request from the in-vehicle device 101 via the communication unit 404, the control unit 204 associates the topic included in the registration request with the IP address, port number, and the like and stores the same in the storage unit 402. By this processing, the in-vehicle device 101 is subscription-registered for the topic "Intersection_00A" in the broker unit 403.

Although not shown, when the in-vehicle device 101 transmits the position information, the control unit 405 of the server 106 that has received the position information causes the topic management unit 401 to select a topic, and topic registration of the in-vehicle device 101 may be performed by the broker unit 403 as a proxy.

The in-vehicle device 101 may set "Subscribe" to "message type" using the format shown in FIG. 8B, add position information instead of setting "topic" and transmit a subscription registration request.

The control unit 405 of the server 106 that received the registration request causes the topic management unit 401 to select a topic because there is no topic setting but position information has been added, and the broker unit 403 may perform topic registration as a proxy for the in-vehicle device 101.

Meanwhile, the cameras 103 and 104 installed on the road are capturing an image of the intersections A107 and B108. As described above, each of the cameras 103 and 104 has the video analysis unit 303 that analyzes captured video data, and the video analysis unit 303 analyzes captured data.

Here, it is assumed that an accident has occurred at the intersection A107 that the vehicle 102 is approaching. The camera 103 analyzes imaging data in the video analysis unit 303 and recognizes that an accident has occurred at the intersection A107. The control unit 306 of the camera 103 forms the analysis result of the video analysis unit 303 into a message in a format that can be published and distributed by the message processing unit 304. Specific processing will be described below using the message format example of FIG. 8 as well.

The message processing unit 304 of the camera 103 sets "Publish" to "message type" of a message using the format shown in FIG. 8A at the time of publishing distribution.

Subsequently, the message processing unit 304 sets the topic "Intersection_00A" associated with the installation location of the camera 103 to "message length," "topic length," and "topic" of the message to generate the message.

In step F709, the control unit 306 causes the message processing unit 304 to store the analysis result of the video analysis unit 303 in the "message" of the message and sends this message to the server 106 via the communication unit 305 as a publishing distribution request.

When the control unit 405 of the server 106 receives the publishing distribution request from the camera 103, the broker unit 403 checks the registration state of the topic included in the publishing distribution request. Specifically, it checks presence or absence of a device that has subscription-registered to the topic included in the publishing request.

Here, as described above, the in-vehicle device 101 has already performed subscription registration processing for the topic "Intersection_00A." Therefore, in step F710, the control unit 405 distributes a published message received from the camera 103 to the in-vehicle device 101 via the communication unit 404.

In step S510, the in-vehicle device 101 receives the published message transmitted in processing of step F710. This processing is an example of a reception step of receiving the published message transmitted from the server 106 in accordance with a registration/cancellation state according to the subscription registration request and the subscription cancellation request transmitted in the transmission step.

By receiving the published message based on the publishing distribution request issued by the camera 103, the in-vehicle device 101 can ascertain that the accident has occurred near the intersection A107.

At step F711, the vehicle 102 is moving. In step S511, the distribution connection area detection unit 207 detects entry/exit to/from the distribution connection area based on information from the measurement unit 203 of the in-vehicle device 101. Processing of step S511 is executed at any time.

Figure 10A:
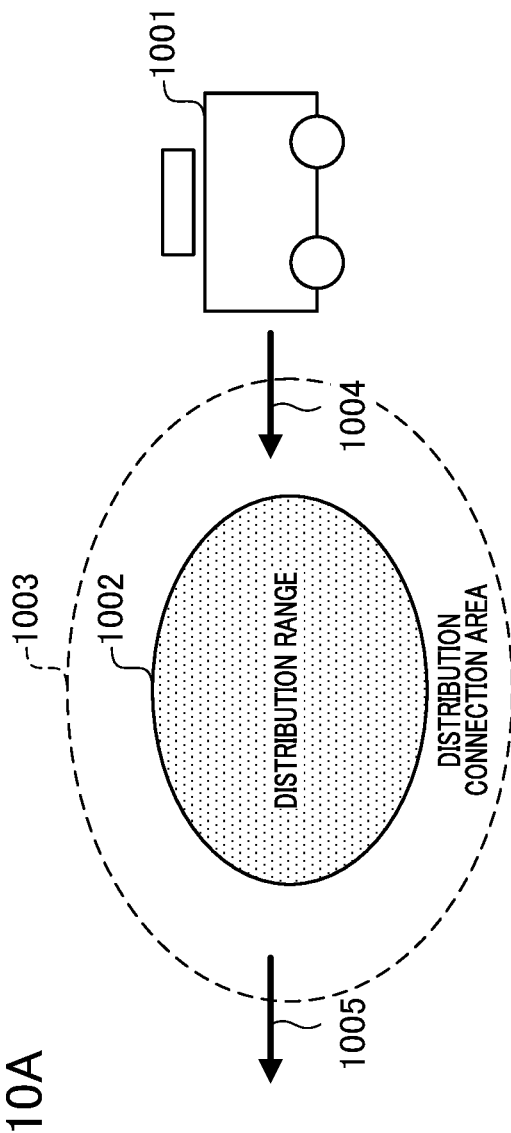
FIGS. 10A and 10B are diagrams for describing entering and exiting a distribution connection area.

FIG. 10A is a diagram for describing detection of entry/exit of a vehicle in a distribution area and a distribution connection area. A vehicle 1001 travels along a route 1004 and a route 1005. A distribution range 1002 indicates a distribution range of information associated with a topic name.

A distribution connection area 1003 indicates a distribution connection area around the distribution range 1002. The distribution connection area 1003 may be treated as a part of a range for acquiring distribution information as synonymous with the distribution range 1002.

The vehicle 1001 traveling along the route 1004 moves from outside to inside the distribution connection area 1003. The vehicle 1001 traveling along the route 1005 moves from inside to outside the distribution connection area 1003. Detection of entry/exit to/from the distribution connection area 1003 means detection of movement from inside to outside and movement from outside to inside of this distribution connection area 1003.

The control unit 206 of the in-vehicle device 101 re-acquires the position information of the vehicle 102 via the position information processing unit 201 when the distribution connection area detection unit 207 detects entry/exit to/from the distribution connection area 1003. Here, it is assumed that the vehicle 102 advances from the inside of the distribution connection area of "intersection A" in FIG. 1 toward "intersection B" and moves out of the distribution connection area of "intersection A." Here, the distribution ranges and distribution connection areas of intersection A and intersection B are independent and do not overlap.

The in-vehicle device 101 detects movement from the inside of the distribution connection area corresponding to "intersection A" to the outside through the distribution connection area detection unit 207 and acquires position information of the vehicle 102 from the vehicle 102 via the position information processing unit 201.

At this time, the in-vehicle device 101 acquires position information of "outside the distribution range of intersection A and outside the distribution connection area," notifies the server 106 of the position information by the above-described method, and waits for a response. The control unit 405 of the server 106 also causes the topic management unit 401 to select a topic included in the position information "outside the distribution range of the intersection A and outside the distribution connection area" by the method described above.

Here, any topic identifier is not selected, and the control unit 405 notifies the in-vehicle device 101 of selected "no topic identifier" and "information on next distribution connection area that the vehicle may enter/exit" via the communication unit 404.

A dedicated message may be provided for absence of a selected topic identifier and may represent that a topic to be notified is empty. Distribution connection area information of intersection A and intersection B corresponds to the next distribution connection area that the vehicle may enter/exit.

In step S503, the control unit 206 of the in-vehicle device 101 receives information representing that there is no corresponding topic identifier and information on the next distribution connection area that the vehicle may enter/exit via the communication unit 205. Processing proceeds, and in step S505, the control unit 206 performs comparison with "Intersection_00A" for which subscription registration processing has been previously performed. Processing proceeds, and in step S508, the control unit 206 determines that there are no more topics for which subscription registration has been completed.

In step S509, the control unit 206 performs subscription cancellation processing on corresponding topics. Specific processing will be described using the message format example shown in FIG. 8. At the time of subscription, the message processing unit 204 sets "Unsubscribe" to the "message type" of the message using the format shown in FIG. 8B.

Subsequently, the message processing unit 204 sets a topic name "Intersection_00A" to be unregistered to the "message length," "topic length," and "topic" of the message to generate the message.

The control unit 206 transmits the message generated by the message processing unit 204 to the server 106 via the communication unit 205 as a subscription registration cancellation request. This processing is an example of a transmission step of transmitting a subscription registration request and a subscription cancellation request to the server 106 according to the comparison result of the comparison step.

The control unit 405 of the server 106 receives the subscription registration cancellation request from the in-vehicle device 101 via the communication unit 404. Subsequently, the control unit 405 cancels subscription registration by deleting, from the storage unit 402, the IP address, port number, and the like of the device that is a registration cancellation request source from a list of subscription registration information devices related to the requested topic through the broker unit 403.

Here, it is assumed that the vehicle 102 has moved from the outside to the inside of the distribution connection area of "intersection B" in FIG. 1. The in-vehicle device 101 detects that the vehicle has moved from the outside to the inside of the distribution connection area corresponding to "intersection B" from the information on the next distribution connection area that the vehicle may enter/exit, received by the distribution connection area detection unit 207.

The in-vehicle device 101 acquires the position information of "intersection B position information" through the method described above. In step F712, the control unit 206 notifies the server 106 of the acquired position information "intersection B position information" through the method described above and waits for a response. In step F713, the control unit 405 of the server 106 causes the topic management unit 401 to select a topic having a distribution range and a distribution connection area in which "intersection B position information" is included through the method described above.

Here, in step F714, the topic management unit 401 selects "Intersection_00B" as a topic identifier. In step F715, the control unit 405 notifies the in-vehicle device 101 of "selected topic," "distribution connection area information corresponding to the topic," and "information on the next distribution connection area that the vehicle may enter/exit" via the communication unit 404.

In step F716, when the topic "Intersection_00B" is received via the communication unit 205, the control unit 206 performs subscription registration processing on the topic "Intersection_00B" in processing at the time of subscription described above. Thereafter, in steps F717 and F718, the in-vehicle device 101 acquires information near intersection B108 which is a travel range of the vehicle 102.

Figure 10B:
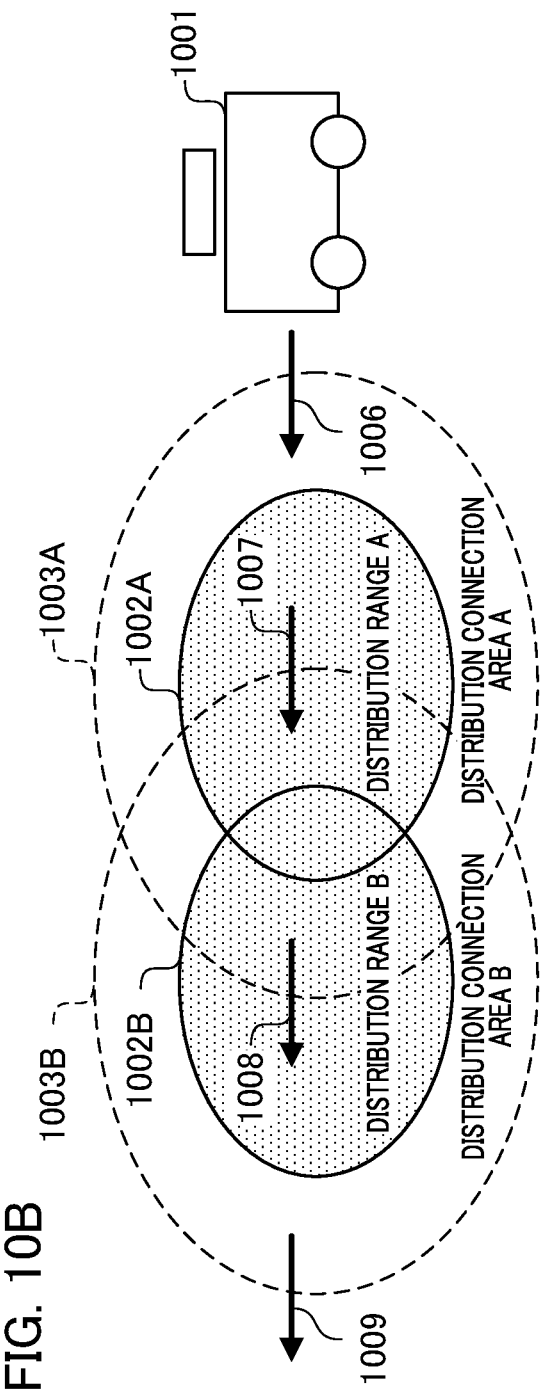

In step S506, the control unit 206 of the in-vehicle device 101 performs different processing depending on topics to be notified. For example, in a case where a distribution range 1002A of "intersection A" and a distribution range 1002B of "intersection B" overlap, as shown in FIG. 10B, if the vehicle 1001 passes through a route 1006, processing as described above is performed.

The vehicle 1001 passes through a route 1007 when it moves from a state in which it has already entered the distribution range 1002A of "intersection A" to the distribution connection area 1003B of "intersection B." The in-vehicle device 101 detects movement from the outside to the inside of the distribution connection area 1003B through the distribution connection area detection unit 207.

The in-vehicle device 101 acquires both "intersection A position information" and "intersection B position information" through the method described above, notifies the server 106 of the position information, and waits for a response.

The control unit 405 of the server 106 also selects topics included in both the "intersection A position information" and the "intersection B position information" by the topic management unit 401 through the method described above. That is, the in-vehicle device 101 is notified of the two topics "Intersection_00A" and "Intersection_00B" in a state in which the topic "Intersection_00A" has been registered.

In this case, subscription registration processing for "Intersection_00A" is not performed, and only subscription registration processing for "Intersection_00B" is performed.

Further, the vehicle 1001 passes through a route 1008 when it moves from a state in which it has entered a distribution connection area 1003A of "intersection A" and a distribution range 1002B of "intersection B" to the distribution range 1002B of "intersection B."

The in-vehicle device 101 detects movement from the inside to the outside of the distribution connection area 1003A through the distribution connection area detection unit 207. The in-vehicle device 101 acquires the position information "intersection B position information" through the method described above, notifies the server 106 of the position information, and waits for a response.

In the control unit 405 of the server 106 as well, the topic management unit 401 selects a topic included in the "intersection B position information" by the method described above. That is, the in-vehicle device 101 is notified of the topic "Intersection_00B" in a state in which both the topics "Intersection_00A" and "Intersection_00B" have been registered.

In this case, it is determined that "Intersection_00A" no longer has any subscribing topics, and the subscribing cancellation process for that topic is performed. Further, since the topic "Intersection_00B" has already been registered, the subscription registration process is not performed.

Further, the vehicle 1001 passes through a route 1009 when it moves from a state in which it has entered the distribution connection area 1003B of "intersection B" to a position that is not included in any distribution range or distribution connection area.

The in-vehicle device 101 detects movement from the inside to the outside of the distribution connection area 1003B through the distribution connection area detection unit 207. The in-vehicle device 101 acquires position information of "outside the distribution range of the intersection B and outside the distribution connection area" through the method described above, notifies the server 106 of the position information, and waits for a response.

The control unit 405 of the server 106 also selects absence of corresponding topics by the topic management unit 401 through the method described above. That is, the in-vehicle device 101 is notified that there is no corresponding topics in a state in which the topic "Intersection_00B" has been registered. In this case, "Intersection_00B" is determined to have no longer subscription-registered topic, and subscription registration cancellation processing for the corresponding topics is performed.

Next, behaviors of the in-vehicle device 101 and the server 106 according to change in distribution connection area information will be described. Topic identifiers, target position information, distribution range information, and distribution connection area information managed by the topic management unit 104 of the server 106 may be newly created, updated, or deleted at arbitrary timing.

When information of topic identifiers and distribution ranges has been newly created, the control unit 405 of the server 106 notifies the in-vehicle devices 101 of the vehicles 102 present near a target distribution range of information related to creation of new topic identifiers via the communication unit 404.

Upon receiving the notification via the communication unit 205 of the in-vehicle device 101, the control unit 206 acquires the current position from the position information processing unit 201, notifies the server 106 of the current position through the method described above, and waits for a response. Subsequent processing is the same as the above-described processing, and thus description thereof is omitted.

The in-vehicle device 101 may determine whether or not subscription registration of a notified new topic identifier is necessary. Specifically, if the control unit 206 of the in-vehicle device 101 determines that the current position is within the distribution range and the distribution connection area of the topic identifier, subscription registration of the topic is executed.

If the current position is outside the distribution range and the distribution connection area of the topic identifier, it is stored in the storage unit 202 as the next distribution connection area that the vehicle may enter/exit. Further, when information related to an existing topic identifier has been updated, the same processing as that for new creation described above is performed.

Further, when an existing topic identifier has been deleted, the control unit 405 of the server 106 notifies all subscribers that have registered the target topic identifier that the topic identifier has been deleted via the communication unit 404. Upon receiving the notification via the communication unit 205 of the in-vehicle device 101, the control unit 206 executes subscription registration cancellation processing for the deleted topic identifier.

As described above, the in-vehicle device operates as a subscriber. The in-vehicle device detects entry/exit to/from a distribution range or a distribution connection area based on position information of a vehicle in which it is mounted. The in-vehicle device notifies the server having the topic management function of the position information of the vehicle, and causes the topic management function to select an optimal topic on the basis of the position information.

According to this selection processing, the in-vehicle device can receive only an optimal message from among various messages that are published and distributed. Accordingly, communication of position information between the in-vehicle device and the server can be minimized, and processing and a bandwidth required for communication therebetween can be reduced.

In addition, selection of topics to be subscription-registered, sorting out of published messages, and the like are not required on the in-vehicle device side, and thus it is possible to notify vehicle drivers of optimal traffic information without delay.

Second Embodiment

Processing based on the position of a vehicle while it is traveling has been described in the first embodiment. In a second embodiment, an example in which the present invention is applied to a destination of a vehicle will be described.

Figure 11:
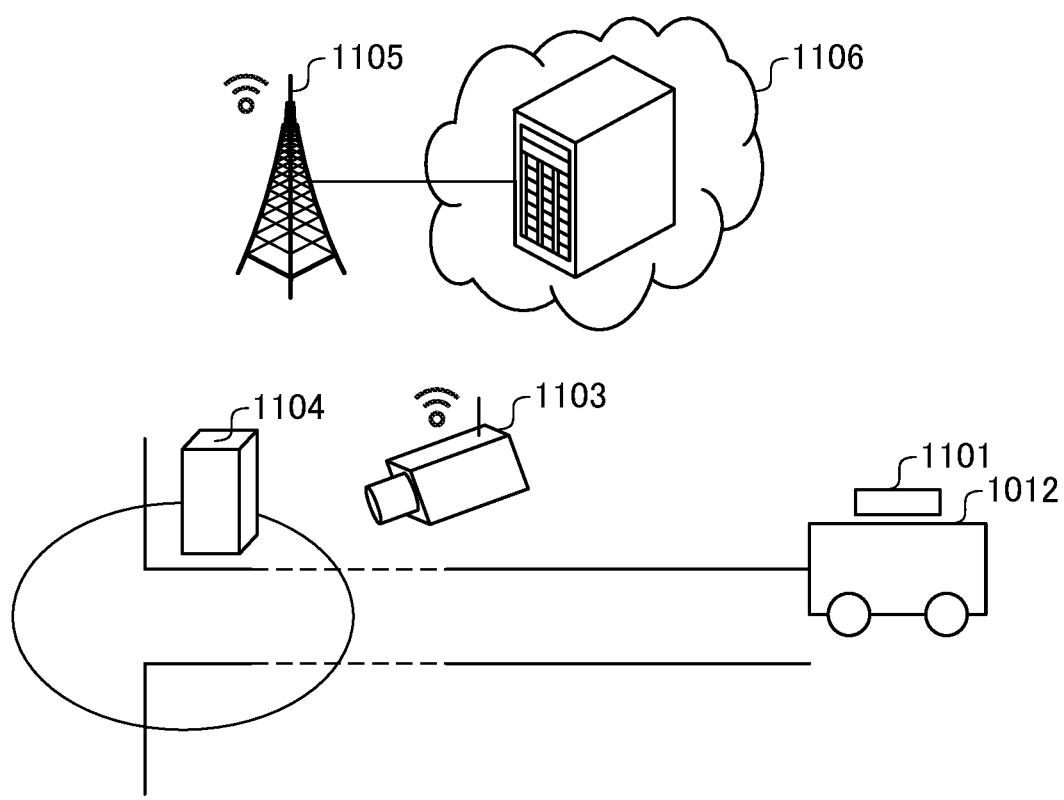
FIG. 11 is a diagram showing a schematic configuration of a system according to a second embodiment of the present invention.

A system configuration in the second embodiment will be described using FIG. 11. FIG. 11 is a diagram showing a schematic configuration of a system according to the second embodiment of the present invention.

FIG. 11 shows a state in which a vehicle 1012 is traveling toward a destination 1104. In the second embodiment, position information of the vehicle 1012 is information indicating the position of the destination 1104 of the vehicle 1012. A camera 1103 is installed on a road around the destination 1104 and captures an image of the surrounding road.

Configurations of an in-vehicle device 1101, the camera 1103, and a server 1106 shown in FIG. 11 are the same as those of the in-vehicle device 101, the camera 103, and the server 106 of the first embodiment. Therefore, the second embodiment will be described using the configurations shown in FIGS. 2 to 4.

(Description of Processing)

Figure 12:
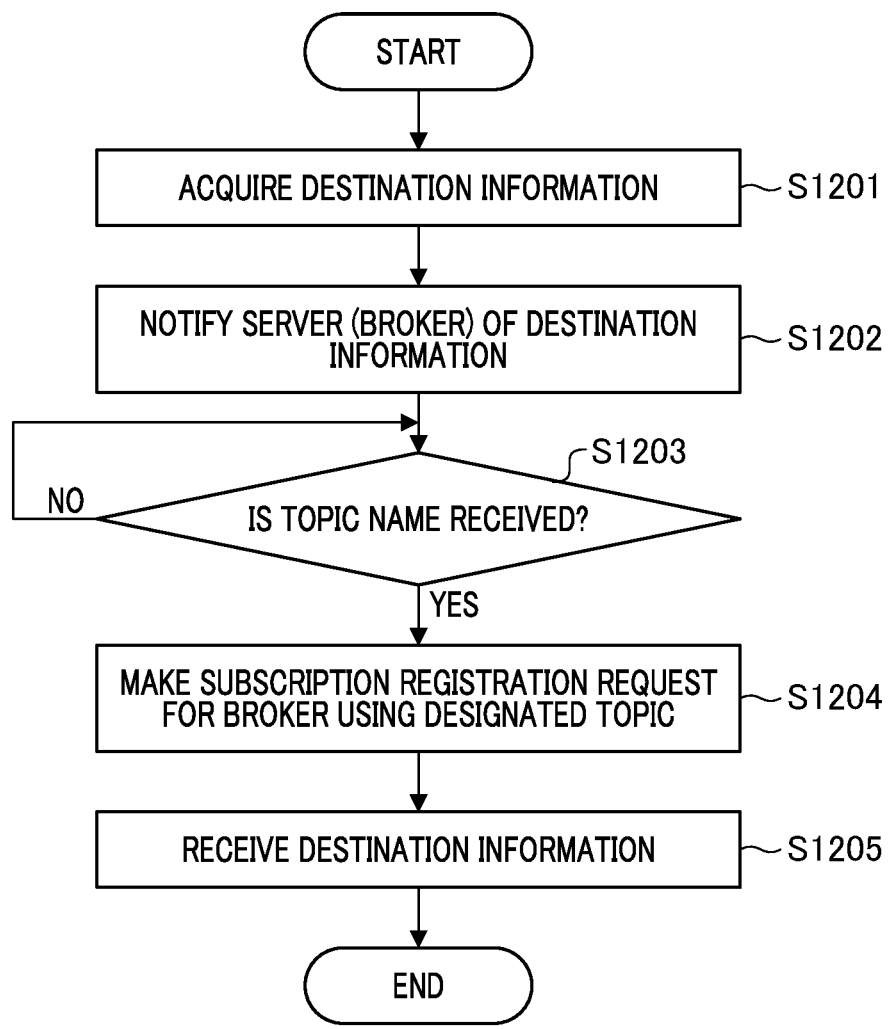
FIG. 12 is a flowchart showing processing executed by an in-vehicle device 1101 shown in FIG. 11.

Processing of the system of the second embodiment will be described below with reference to the flowcharts shown in FIGS. 12 and 13 and the operation sequence diagram shown in FIG. 14. FIG. 12 is a flowchart showing processing executed by the in-vehicle device 1101.

The flowchart shown in FIG. 12 can be realized by the control unit 206 executing a control program stored in the storage unit 202 to perform calculation and processing of information and control of each piece of hardware.

Figure 13:
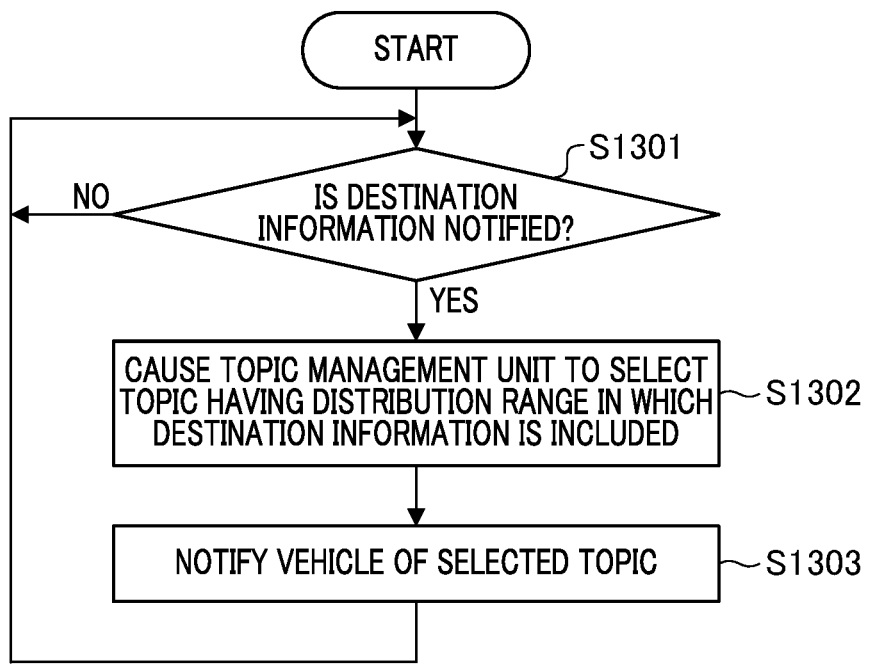
FIG. 13 is a flowchart showing processing executed by a server device 1106 shown in FIG. 11.
Figure 14:
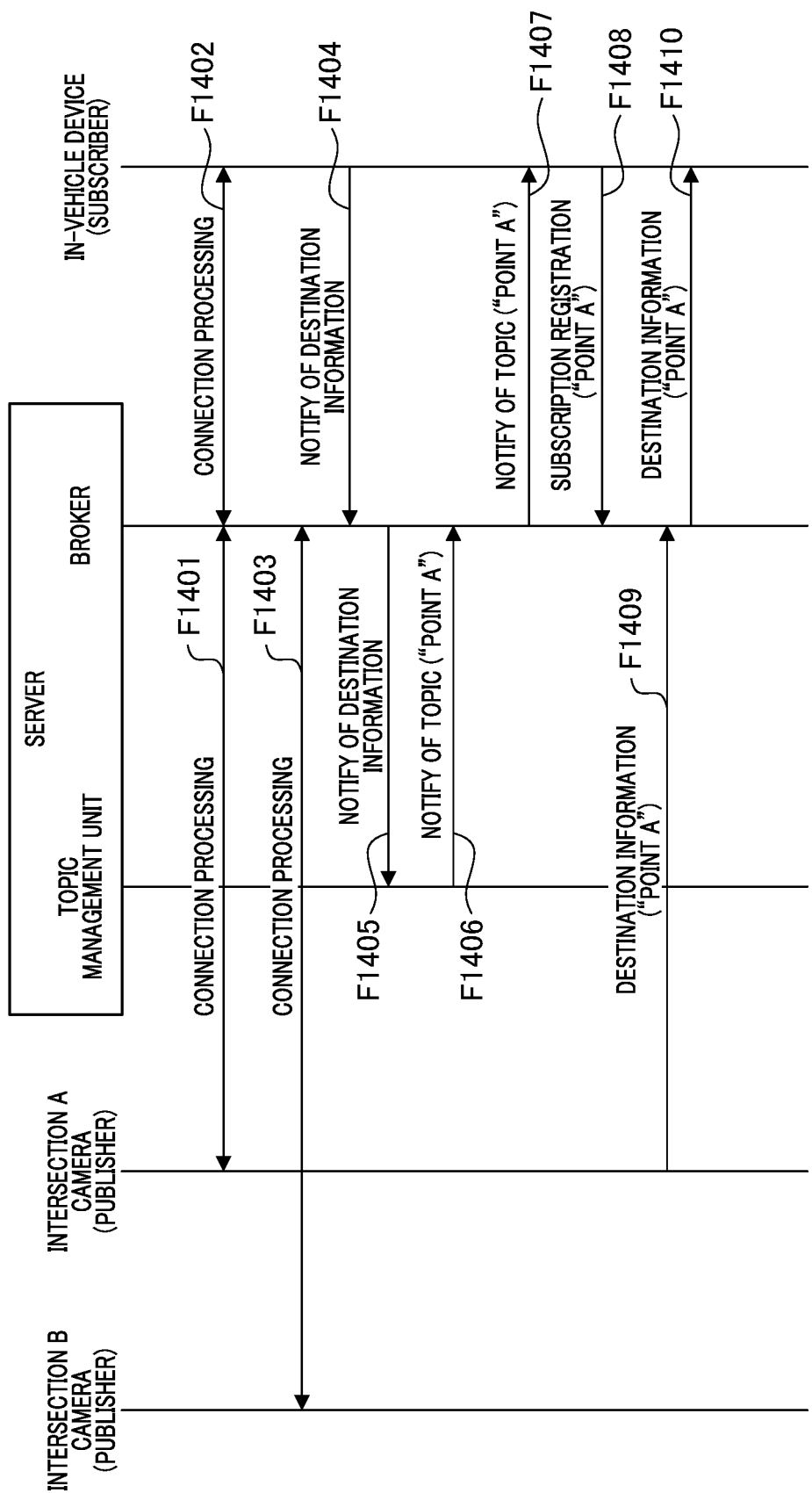
FIG. 14 is an operation sequence diagram of the system according to the second embodiment of the present invention.

FIG. 13 is a flowchart showing processing executed by the server device 1106. The flowchart shown in FIG. 13 can be realized by the control unit 306 executing a control program stored in the storage unit 302 to perform calculation and processing of information and control of each piece of hardware.

The in-vehicle device 1101, the camera 1103, and the server 1106 are in a state in which they can communicate on the same network through a base station 1105. In steps F1401 to F1403 of FIG. 14, the in-vehicle device 1101, the camera 1103, and the server 1106 perform connection processing according to a protocol that realizes the publishing/subscribing method.

Examples of a protocol of the publishing/subscribing method include MQ Telementary Transport (MATT) and Robot Operating System (ROS). Any one may be used in the second embodiment.

In step S1201, the control unit 206 of the in-vehicle device 1101 acquires destination information from the vehicle 1012 via a car navigation device or the like of the vehicle 1012 equipped with the in-vehicle device 1101 through the position information processing unit 201.

Here, it is assumed that the vehicle 1012 is traveling toward the destination 1104 in FIG. 11. Although destination information is originally composed of complicated data such as GNSS data, the destination information of the destination 1104 is represented as "point A" here for ease of understanding.

In steps S1202 and F1404, the control unit 206 notifies the server 1106 of the acquired destination information "point A" via the communication unit 205 and waits for a response from the server 1106.

In step S1301, the control unit 405 of the server 1106 receives the destination information "point A" of the vehicle 1012 from the in-vehicle device 1101 via the communication unit 404. Subsequently, in steps S1302 and F1405, the control unit 405 causes the topic management unit 401 to select a topic having a distribution range in which "point A information" is included.

Since the topic selection method is the same as the first embodiment, description thereof is omitted here. Here, it is assumed that a topic related to "point A" is "Intersection_00A." In steps S1303 and F1406, the control unit 405 notifies the in-vehicle device 1101 of the selected topic via the communication unit 404.

In steps S1203 and F1407, the control unit 206 of the in-vehicle device 1101 receives the topic "Intersection_00A" via the communication unit 205. In steps S1204 and F1408, the control unit 206 causes the message processing unit 204 to make a subscription registration request for the server 1106 using the received topic.

Since the topic registration method in the in-vehicle device 1101 and server 1106 is the same as in the first embodiment, description thereof is omitted here. Meanwhile, the camera 1103 installed on the road captures an image of surrounding roads including the destination 1104. As described above, the camera 1103 has the video analysis unit 303 that analyzes captured video data and analyzes captured data using this function.

Here, it is assumed that a traffic jam has occurred around the destination 1104. The camera 1103 analyzes captured data with the video analysis unit 303 and recognizes that a traffic jam has occurred around the destination 1104.

In step F1409, the control unit 306 of the camera 1103 causes the message processing unit 304 to form the analysis result into a message in a publishable distribution format and sends the message to the server 1106 via the communication unit 305. Since a specific method of sending a publishing distribution message is the same as in the first embodiment, description thereof is omitted here.

Thereafter, the method for the in-vehicle device 1101 to receive the publishing distribution message of the camera 1103 via the server 1106 is the same as in the first embodiment, and thus description thereof is omitted here. In steps S1205 and F1410, the in-vehicle device 1101 ascertains that the traffic jam has occurred near the destination 1104 by receiving a published message issued by the camera 1103.

Although the in-vehicle device 1101 performs subscription registration on the basis of destination information in the second embodiment, along with this, subscription registration of a communication method provided by the communication unit 205 of the in-vehicle device 1101 is conceivable.

For example, it is considered a case where the communication method provided by the communication unit 205 is a communication method capable of large-capacity communication. In this case, the in-vehicle device 1101 can directly receive video data of the camera 1103 by receiving publishing notification of the IP address, URL, and the like of the camera 1103 from the camera 1103.

As described above, according to the present invention, the in-vehicle device mounted on a vehicle operates as a subscriber. The in-vehicle device notifies a server having a broker function of the position information of the vehicle in which it is mounted. The in-vehicle device can always receive an optimal published message by causing the broker function of the server to select an optimal topic on the basis of the position information.

Therefore, according to the present invention, selection of topics to be subscribed, sorting out of published messages, and the like are not required on the in-vehicle device side, and thus it is possible to notify vehicle drivers of optimal traffic information without delay.

Further, according to the present invention, position information and topics can be notified at an appropriate communication frequency between the in-vehicle device and the server. For this reason, an optimal topic can always be selected with a small processing load, and thus it is possible to obtain optimal road information that matches driving conditions of a host vehicle to support perception, determination and operation of a driver more faithfully.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

Meanwhile, the movable apparatus is not limited to vehicles such as automobiles and can be in any form as long as it can be moved by being driven by a mobile unit, such as ships, trains, drones, AGVs, and robots.

In addition, as a part or the whole of the control according to the embodiments, a computer program realizing the function of the embodiments described above may be supplied to the control device through a network or various storage media. Then, a computer (or a CPU, an MPU, or the like) of the control device may be configured to read and execute the program. In such a case, the program and the storage medium storing the program configure the present invention.

This application claims the benefit of Japanese Patent Application No. 2022-093022, filed on Jun. 8, 2022, which is hereby incorporated by reference herein in its entirety.

What is claimed is:

1. A control method for a control device mounted on a movable apparatus, comprising:

acquiring position information of the movable apparatus;

notifying an information processing device of the position information acquired in the position information acquisition;

acquiring, from the information processing device, distribution connection area information corresponding to the position information notified in the position information notification;

transmitting any one of a subscription registration request and a subscription cancellation request to the information processing device on the basis of an area indicated by the distribution connection area information acquired in the distribution connection area acquisition and a position indicated by the position information acquired in the position information acquisition;

receiving a published message transmitted from the information processing device in response to the request transmitted in the transmission; and determining an area to connect to the information processing device based on the distribution connection area information, wherein the distribution connection area information is information indicating a connection area of a distribution range corresponding to a communication area of a base station, and the distribution connection area corresponds to an area provided, wherein the movable apparatus receives distribution of information before reaching the distribution range in consideration of delays including a delay in communication between the control device and the base station and a processing time of the control device.

2. A control device mountable on a movable apparatus, comprising at least one processor or circuit configured to function as:

a position information acquisition unit configured to acquire position information of the movable apparatus;

a position information notification unit configured to notify an information processing device of the position information acquired by the position information acquisition unit;

a distribution connection area acquisition unit configured to acquire, from the information processing device, distribution connection area information corresponding to the position information notified by the position information notification unit;

a transmission unit configured to transmit any one of a subscription registration request and a subscription cancellation request to the information processing device on the basis of an area indicated by the distribution connection area information acquired by the distribution connection area acquisition unit and a position indicated by the position information acquired by the position information acquisition unit;

a reception unit configured to receive a published message transmitted from the information processing device in response to the request transmitted by the transmission unit; and a determination unit configured to determine an area to connect to the information processing device based on the distribution connection area information, wherein the distribution connection area information is information indicating a connection area of a distribution range corresponding to a communication area of a base station, and the distribution connection area corresponds to an area provided, wherein the movable apparatus receives distribution of information before reaching the distribution range in consideration of delays including a delay in communication between the control device and the base station and a processing time of the control device.

3. The control device according to claim 2, wherein the at least one processor or circuit is further configured to function as:

a comparison unit configured to compare the area indicated by the distribution connection area information acquired by the distribution connection area acquisition unit with the position indicated by the position information acquired by the position information acquisition unit, wherein the transmission unit transmits any one of the subscription registration request and the subscription cancellation request to the information processing device according to a comparison result of the comparison unit.

4. The control device according to claim 2, wherein the distribution connection area information is calculated based on a boundary of distribution range information indicating an area for distributing the published message.

5. The control device according to claim 2, wherein the transmission unit transmits the subscription registration request and the subscription cancellation request if the position indicated by the position information enters or exits the area indicated by the distribution connection area information.

6. The control device according to claim 2, wherein the position information of the movable apparatus acquired by the position information acquisition unit is position information of a current position of the movable apparatus or position information of a destination of the movable apparatus.

7. The control device according to claim 2, wherein the at least one processor or circuit is further configured to function as:

a receiving unit configured to receive information regarding topics;

wherein the transmission unit is configured to transmit one of a subscription registration request and a subscription cancellation request regarding the topics to the information processing device on the basis of the area indicated by the distribution connection area information acquired by the distribution connection area acquisition unit and a position indicated by the position information acquired by the position information acquisition unit.

8. The control device according to claim 2, wherein the at least one processor or circuit is further configured to function as:

a communication method providing unit configured to provide information relating to the communication method to the information processing device.

9. A movable apparatus comprising at least one processor or circuit configured to function as:

a position information acquisition unit configured to acquire position information of the movable apparatus;

a position information notification unit configured to notify an information processing device of the position information acquired by the position information acquisition unit;

a distribution connection area acquisition unit configured to acquire, from the information processing device, distribution connection area information corresponding to the position information notified by the position information notification unit;

a transmission unit configured to transmit any one of a subscription registration request and a subscription cancellation request to the information processing device on the basis of an area indicated by the distribution connection area information acquired by the distribution connection area acquisition unit and a position indicated by the position information acquired by the position information acquisition unit;

a reception unit configured to receive a published message transmitted from the information processing device in response to the request transmitted by the transmission unit;

a moving unit configured to move the movable apparatus; and a determination unit configured to determine an area to connect to the information processing device based on the distribution connection area information, wherein the distribution connection area information is information indicating a connection area of a distribution range corresponding to a communication area of a base station, and the distribution connection area corresponds to an area provided, wherein the movable apparatus receives distribution of information before reaching the distribution range in consideration of delays including a delay in communication between a control device and the base station and a processing time of the control device.

10. A non-transitory computer-readable storage medium configured to store a computer program to control a control device mounted on a movable apparatus, wherein the computer program comprises instructions for executing following processes:

acquiring position information of the movable apparatus;

notifying an information processing device of the position information acquired in the position information acquisition;

acquiring, from the information processing device, distribution connection area information corresponding to the position information notified in the position information notification;

transmitting any one of a subscription registration request and a subscription cancellation request to the information processing device on the basis of an area indicated by the distribution connection area information acquired in the distribution connection area acquisition and a position indicated by the position information acquired in the position information acquisition;

receiving a published message transmitted from the information processing device in response to the request transmitted in the transmission; and determining an area to connect to the information processing device based on the distribution connection area information, wherein the distribution connection area information is information indicating a connection area of a distribution range corresponding to a communication area of a base station, and the distribution connection area corresponds to an area provided, wherein the movable apparatus receives distribution of information before reaching the distribution range in consideration of delays including a delay in communication between the control device and the base station and a processing time of the control device.

11. An information processing device, comprising at least one processor or circuit configured to function as:

a position information managing unit configured to manage position information and associated topics;

a distribution range information managing unit configured to manage distribution connection area information and the associated topics;

a position information receiving unit configured to receive position information of an external apparatus from the external apparatus;

an identifier selection unit configured to select topics based on the position information managed by the position information managing unit and the position information received by the position information receiving unit;

a topics notification unit configured to notify information regarding the topics selected by the identifier selection unit to the external apparatus;

a distribution range information notification unit configured to notify the distribution range information linked to the topics notified by the topics notification unit; and a determination unit configured to determine an area to connect to the information processing device based on the distribution connection area information, wherein the distribution connection area information is information indicating a connection area of a distribution range corresponding to a communication area of a base station, and the distribution connection area corresponds to an area provided, wherein a movable apparatus receives distribution of information before reaching the distribution range in consideration of delays including a delay in communication between a control device and the base station and a processing time of the control device.

12. The information processing device according to claim 11, wherein the distribution range information notification unit notifies the distribution connection area information relating to the area into which the external apparatus is to enter to the external apparatus.

\* \* \* \* \*